US012655766B1

(12) United States Patent (10) Patent No.: US 12,655,766 B1
Blaney et al. (45) Date of Patent: Jun. 16, 2026

(54) FAN INLET CASE STRUT

(71) Applicant: RTX Corporation, Farmington, CT (US)

(72) Inventors: Ken F. Blaney, Middleton, NH (US); Kerrin Elizabeth Morgan Connors, Binghamton, NY (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/169,343

(22) Filed: Apr. 3, 2025

(51) Int. Cl.
| | |
|---|---|
| *F01D 5/14* | (2006.01) |
| *F01D 9/04* | (2006.01) |
| *F02C 7/04* | (2006.01) |

(52) U.S. Cl.
CPC .............. *F01D 5/14* (2013.01); *F01D 9/041* (2013.01); *F02C 7/04* (2013.01); *F05D 2240/12* (2013.01)

(58) Field of Classification Search
CPC .......... F01D 5/141; F01D 5/145; F01D 5/147; F01D 5/28; F01D 5/18; F01D 5/286; F01D 5/282; F01D 9/065; F05D 2240/121; F05D 2240/12; F02C 7/04
See application file for complete search history.

(56) References Cited

U.S. PATENT DOCUMENTS

| | | | | |
|---|---|---|---|---|
| 3,762,835 | A * | 10/1973 | Carlson .................... | F01D 5/147 |
| | | | | 29/889.71 |
| 4,010,530 | A * | 3/1977 | Delgrosso ............ | B23K 35/286 |
| | | | | 29/445 |
| 4,895,491 | A * | 1/1990 | Cross .................... | F04D 29/388 |
| | | | | 29/889.7 |
| 5,210,946 | A * | 5/1993 | Monroe ................ | F04D 29/388 |
| | | | | 29/525.07 |
| 5,908,285 | A * | 6/1999 | Graff ........................ | C25D 1/10 |
| | | | | 416/224 |
| 6,132,857 | A * | 10/2000 | Champenois ......... | F04D 29/324 |
| | | | | 416/241 A |
| 7,789,630 | B2 | 9/2010 | Schilling et al. | |
| 8,088,498 | B2 * | 1/2012 | Smith .................... | F01D 5/282 |
| | | | | 428/678 |
| 8,573,948 | B2 | 11/2013 | Jevons | |
| 8,690,531 | B2 | 4/2014 | Tudor et al. | |
| 9,140,130 | B2 * | 9/2015 | Mironets .................. | B22F 5/04 |
| 9,995,152 | B2 * | 6/2018 | McComb .............. | F04D 29/324 |
| 10,119,407 | B2 * | 11/2018 | Levine ..................... | F01D 9/02 |
| 10,539,025 | B2 * | 1/2020 | Kray ....................... | F01D 9/041 |
| 10,934,851 | B2 * | 3/2021 | Guivarc'h .............. | F01D 5/147 |
| 11,454,209 | B2 * | 9/2022 | Ramanujam .......... | B29C 66/532 |
| 11,939,947 | B2 * | 3/2024 | Ramanujam .......... | F03D 1/0675 |
| 2010/0054945 | A1 * | 3/2010 | McMillan .............. | F01D 5/282 |
| | | | | 415/208.1 |
| 2011/0033308 | A1 * | 2/2011 | Huth ..................... | F04D 29/023 |
| | | | | 416/241 R |

(Continued)

*Primary Examiner* — Eldon T Brockman

(74) *Attorney, Agent, or Firm* — Bachman & LaPointe, P.C.

(57) ABSTRACT

A fan inlet case strut including a strut structural section; a strut cover disposed over a portion of the strut structural section; a strut airfoil section formed with a high pressure surface and a low pressure surface connected at a leading edge and a trailing edge and extending from a first end to a second end, a camber line that extends between the leading edge and the trailing edge and a flow feature formed at a strut cover termination.

17 Claims, 4 Drawing Sheets

(56)        References Cited

U.S. PATENT DOCUMENTS

| | | | |
|---|---|---|---|
| 2011/0049297 A1* | 3/2011 | Jevons | F01D 5/284 |
| | | | 156/927 |
| 2011/0116906 A1* | 5/2011 | Smith | F04D 29/324 |
| | | | 416/61 |
| 2011/0164986 A1* | 7/2011 | Roberts | F01D 5/282 |
| | | | 416/241 R |
| 2014/0030105 A1* | 1/2014 | Fameau | F01D 5/282 |
| | | | 416/229 A |
| 2017/0254212 A1 | 9/2017 | Pautard et al. | |
| 2017/0274403 A1* | 9/2017 | Miki | F01D 25/00 |
| 2020/0191001 A1* | 6/2020 | Okabe | F01D 5/282 |
| 2024/0240571 A1* | 7/2024 | Wood | F01D 25/12 |
| 2025/0052166 A1* | 2/2025 | Kray | F01D 5/141 |

* cited by examiner

FAN INLET CASE STRUT

BACKGROUND

The present disclosure is directed to the improved fan inlet case strut.

A gas turbine engine may include a fan section that provides a bypass airflow for propulsion. The fan section includes a fan inlet case. The fan inlet case includes a fixed row of struts. There is a need to reduce aero blockage losses associated with fan inlet case struts.

SUMMARY

In accordance with the present disclosure, there is provided a fan inlet case strut comprising a strut structural section; a strut cover disposed over a portion of the strut structural section; a strut airfoil section formed with a high pressure surface and a low pressure surface connected at a leading edge and a trailing edge and extending from a first end to a second end; a camber line that extends between the leading edge and the trailing edge and a flow feature formed at a strut cover termination.

A further embodiment of any of the foregoing embodiments may additionally and/or alternatively include a flow feature is formed at the strut cover termination at a predetermined cut back length.

A further embodiment of any of the foregoing embodiments may additionally and/or alternatively include the strut airfoil section comprises a profile defined by a camber-angle distribution designed in conjunction with a thickness distribution configured to induce a localized forced non-equilibrium boundary-layer static pressure-rise process.

A further embodiment of any of the foregoing embodiments may additionally and/or alternatively include the strut structural section comprises a nominal cross-sectional thickness and the fan inlet case strut comprises an extended thickness located beyond the strut cover.

A further embodiment of any of the foregoing embodiments may additionally and/or alternatively include the extended thickness is larger than the nominal cross-sectional thickness.

A further embodiment of any of the foregoing embodiments may additionally and/or alternatively include the flow feature is located at greater than 50% of a chord length of the fan inlet case strut.

A further embodiment of any of the foregoing embodiments may additionally and/or alternatively include the airfoil comprises a surface that is within a distance aft of the flow feature that extends to the trailing edge; wherein a thickness of the airfoil along the distance tapers to a minimum thickness such that the surface is flat up to a minimum radius of the trailing edge.

In accordance with the present disclosure, there is provided a gas turbine engine having a fan inlet case comprising a fan inlet case strut formed within the fan inlet case, the fan inlet case strut comprising a strut structural section; a strut cover disposed over a portion of the strut structural section; a strut airfoil section formed with a high pressure surface and a low pressure surface connected at a leading edge and a trailing edge and extending from a first end to a second end; a camber line that extends between the leading edge and the trailing edge; and a flow feature formed at a strut cover termination; wherein flow feature is formed at the strut cover termination at a predetermined cut back length.

A further embodiment of any of the foregoing embodiments may additionally and/or alternatively include the strut airfoil section comprises a profile defined by a camber-angle distribution designed in conjunction with a thickness distribution configured to induce a localized forced non-equilibrium boundary-layer static pressure-rise process; wherein the forced non-equilibrium boundary-layer pressure-rise locally generates excess turbulence production relative to turbulence dissipation in the boundary-layer, enabling the boundary-layer to briefly tolerate a higher local rate of static pressure-rise without separating.

A further embodiment of any of the foregoing embodiments may additionally and/or alternatively include the strut structural section comprises a nominal cross-sectional thickness and the fan inlet case strut comprises an extended thickness located beyond and external of the strut cover; wherein the extended thickness is larger than the nominal cross-sectional thickness.

A further embodiment of any of the foregoing embodiments may additionally and/or alternatively include the flow feature can be coextensive with a maximum thickness, the flow feature being located at a location greater than 66% of a chord length of the strut airfoil from the leading edge.

A further embodiment of any of the foregoing embodiments may additionally and/or alternatively include the flow feature is located at a location greater than 75% of a chord length of the strut airfoil from the leading edge.

A further embodiment of any of the foregoing embodiments may additionally and/or alternatively include more than one flow feature is formed along a chord length of the strut airfoil.

In accordance with the present disclosure, there is provided a process for forming a fan inlet case strut comprising: forming a strut structural section; forming a strut cover disposed over a portion of the strut structural section; forming a strut airfoil section with a high pressure surface and a low pressure surface connected at a leading edge and a trailing edge and extending from a first end to a second end, a camber line that extends between the leading edge and the trailing edge; and forming a flow feature at a strut cover termination.

A further embodiment of any of the foregoing embodiments may additionally and/or alternatively include the process further comprising forming the flow feature at the strut cover termination at a predetermined cut back length.

A further embodiment of any of the foregoing embodiments may additionally and/or alternatively include the process further comprising forming the strut airfoil section comprising a profile defined by a camber-angle distribution designed in conjunction with a thickness distribution configured to induce a localized forced non-equilibrium boundary-layer static pressure-rise process; wherein the forced non-equilibrium boundary-layer pressure-rise locally generates excess turbulence production relative to turbulence dissipation in the boundary-layer, enabling the boundary-layer to briefly tolerate a higher local rate of static pressure-rise without separating.

A further embodiment of any of the foregoing embodiments may additionally and/or alternatively include the process further comprising forming the strut structural section comprising a nominal cross-sectional thickness; and forming the fan inlet case strut comprising an extended thickness located beyond the strut cover; wherein the extended thickness is larger than the nominal cross-sectional thickness.

A further embodiment of any of the foregoing embodiments may additionally and/or alternatively include the process further comprising locating the flow feature at greater than 50% of a chord length of the fan inlet case strut.

A further embodiment of any of the foregoing embodiments may additionally and/or alternatively include the process further comprising forming the flow feature at a location greater than 75% of a chord length of the struct airfoil from the leading edge.

A further embodiment of any of the foregoing embodiments may additionally and/or alternatively include the process further comprising forming more than one flow feature along a chord length of the strut airfoil.

Other details of the fan inlet case strut are set forth in the following detailed description and the accompanying drawings wherein like reference numerals depict like elements.

BRIEF DESCRIPTION OF THE DRAWINGS

The above and further advantages of this disclosure may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the disclosure.

DETAILED DESCRIPTION

Figure 1:
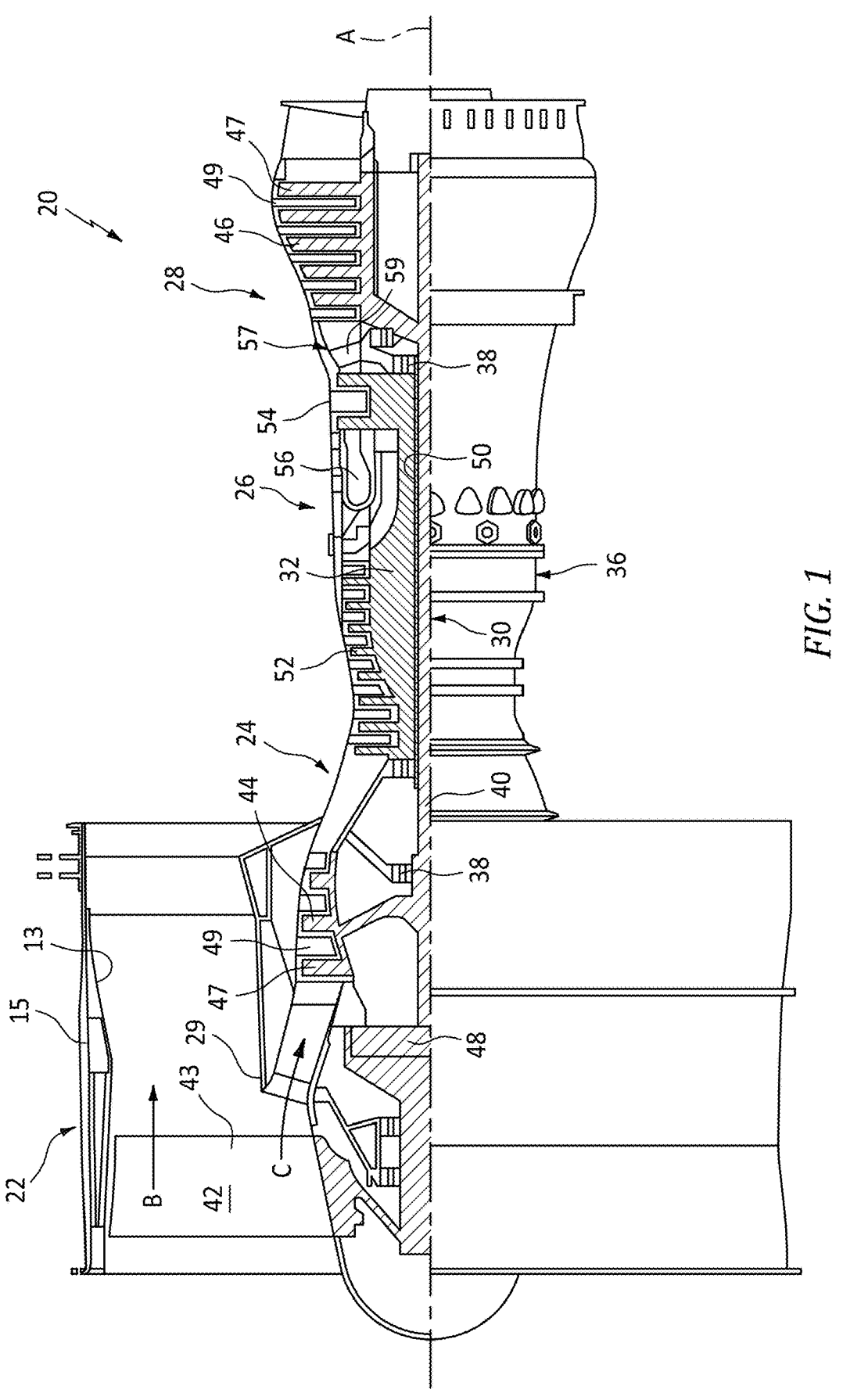
FIG. 1 is a cross section schematic view of an example turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent to the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour lbm/hr of fuel flow rate being burned divided by pounds-force lbf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "Low corrected fan tip speed" is the actual fan tip speed in ft/sec divided by an industry standard temperature correction of $[(Tram \degree R)/(518.7 \degree R)]^{0.5}$. The "low corrected fan tip speed" can be less than or equal to 1150.0 ft/second (350.5 meters/second), and greater than or equal to 1000.0 ft/second (304.8 meters/second).

Figure 2:
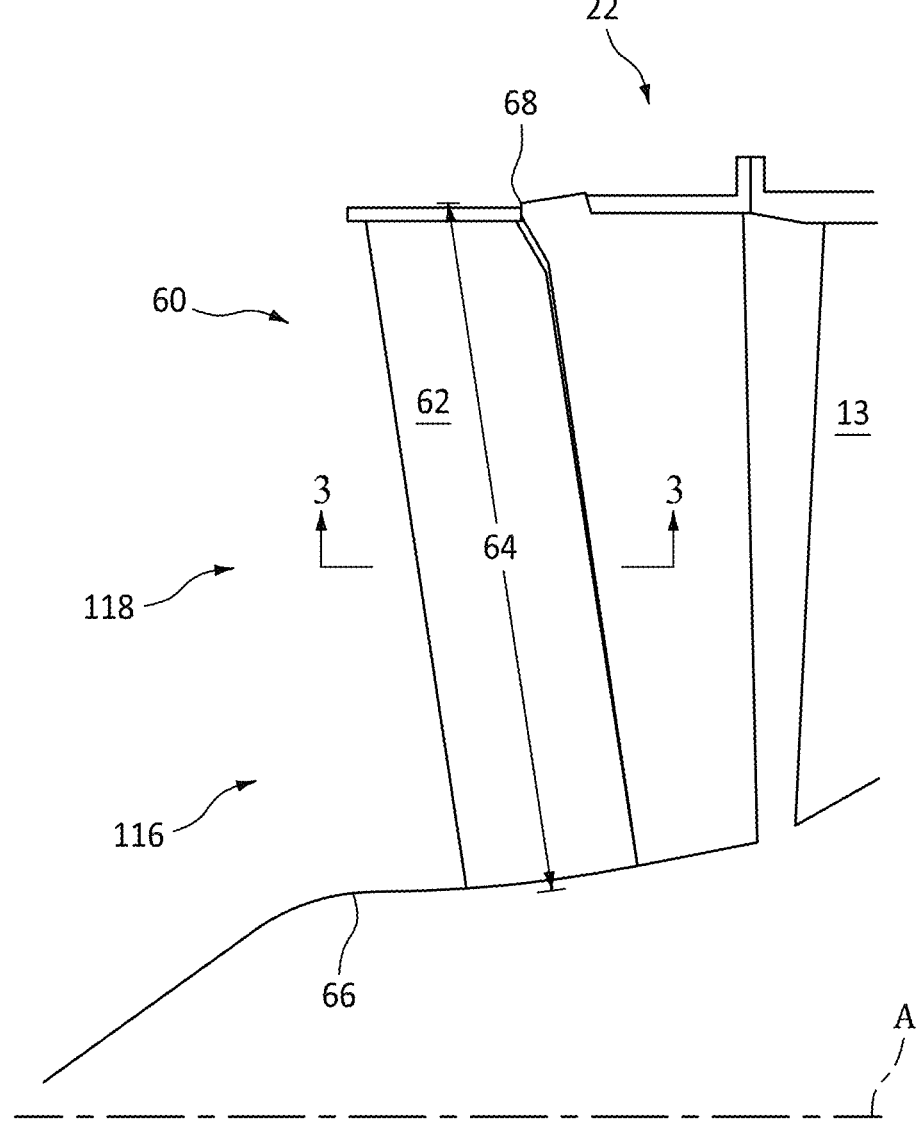
FIG. 2 is a cross section schematic representation of an exemplary fan inlet case area.

Referring also to FIG. 2 an exemplary fan inlet case area 60 is shown. The fan inlet case area 60 includes a fan inlet case strut 62. The fan inlet case strut 62 includes a span dimension 64 extending between an inner surface 66 and an outer surface 68 of the bypass duct 13.

Figure 3:
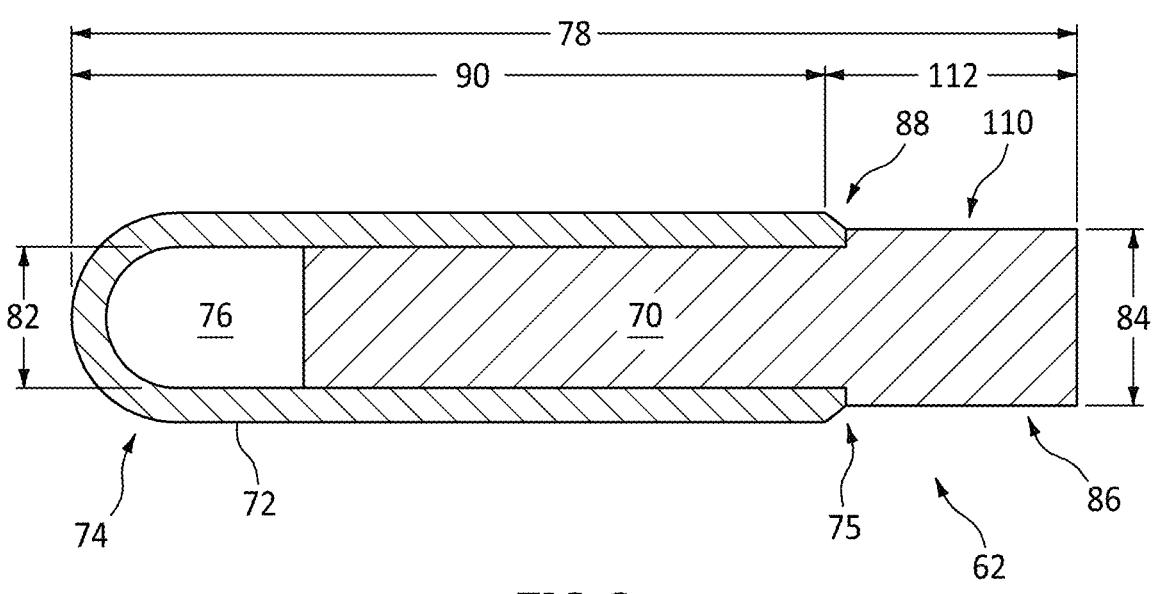
FIG. 3 is a cross section schematic representation of an exemplary fan inlet case strut of FIG. 2.

Also referring to FIG. 3, a cross section of the fan inlet case strut 62 is shown. The strut 62 can include a strut structural section 70. The strut 62 can include an airfoil section 72. In an exemplary embodiment, the airfoil section 72 can include a strut cover 74 formed over the strut structural section 70. The strut cover 74 can form a cavity 76 which can be configured as a flow passage for fluid to flow and perform deicing functions.

Figure 5:
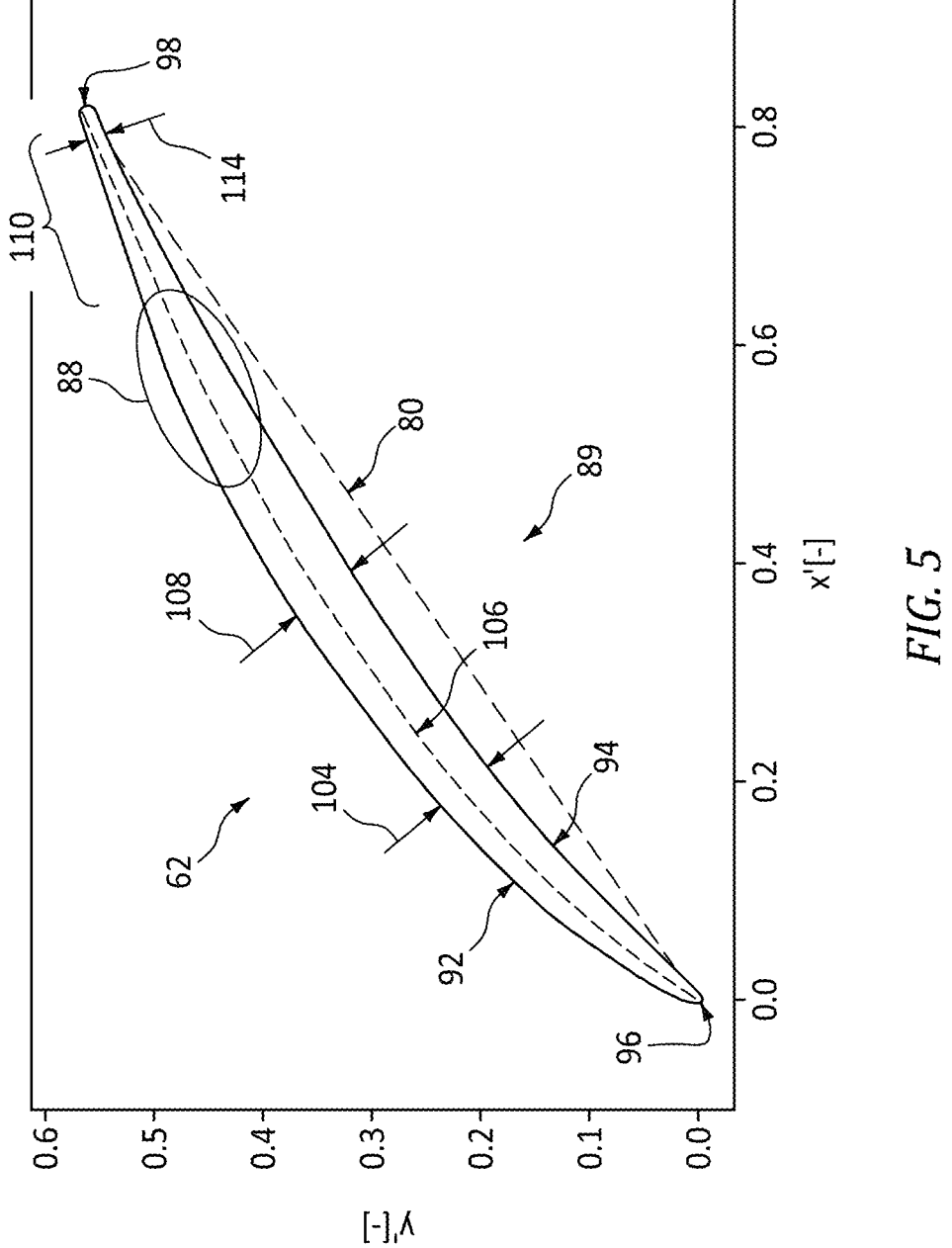
FIG. 5 is a cross section schematic representation of an exemplary airfoil of the fan inlet case strut.

The strut 62 includes a strut length 78 which approximates a chord length 80 as shown in FIG. 5. The strut cover 74 can extend along a portion of the strut length 78. In an exemplary embodiment the strut cover 74 can extend up to 50 percent of the strut length 78. The strut structural section 70 can include a nominal cross sectional thickness 82. The nominal cross sectional thickness 82 can be an average thickness that is encased withing the strut cover 74. The strut 62 can include an extended thickness 84 located beyond and external of the strut cover 74. The extended thickness 84 can be larger than the nominal cross sectional thickness 82. The extended thickness 84 provides for an extended cross sectional area region 86. In an exemplary embodiment, the extended thickness 84 can be from about 40 percent to about 60 percent increase over the nominal cross sectional thickness 82. In an exemplary embodiment, the extended thickness 84 can be a 50 percent increase over the nominal cross sectional thickness 82.

The strut cover 74 can be cut back to form a flow feature 88. The flow feature 88 can be formed as a result of the strut cover 74 being cut back at a termination 75 of the strut cover 74 at a predetermined cut back length 90. The flow feature 88 can be machined into the fan inlet case that do not employ a strut cover 74. The flow feature 88 can be part of an exemplary airfoil 89. The airfoil 89 can include a profile defined by a novel camber-angle distribution designed in conjunction with the thickness distribution to induce a localized forced non-equilibrium boundary-layer static pressure-rise process. The forced non-equilibrium boundary-layer pressure-rise locally generates excess turbulence production relative to turbulence dissipation in the boundary-layer, enabling the boundary-layer to briefly tolerate a higher local rate of static pressure-rise without separating. The resultant static pressure-rise process (diffusion) induced by the novel combination of geometric features is referred to within this specification as an FNBD process for ease of reference (Forced Non-equilibrium Boundary-layer Diffusion). The necessary combination of novel geometric features is referred to as an FNBD feature or simply flow feature 88. The disclosed profile including an FNBD feature provides for improved fan inlet case strut 62 configurations.

Figure 4:
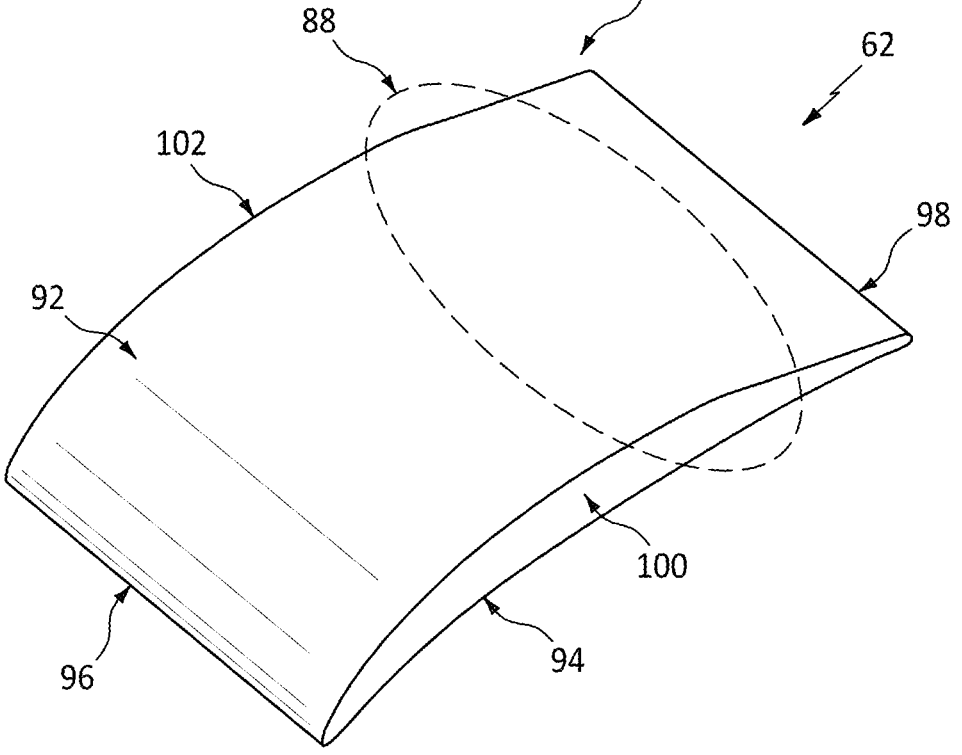
FIG. 4 is a profile view schematic representation of an exemplary airfoil of the fan inlet case strut.

Referring also to FIG. 4 and FIG. 5, showing the schematic representation of an exemplary airfoil of the fan inlet case strut 62. The U.S. patent application publication US 2024/0125241 is incorporated herein by reference. It should be appreciated that the fan inlet case strut 62 may include features of the disclosed airfoil 62 shown in FIG. 3. Moreover, features of the airfoil 62 may be embodied as a part of struts disposed in other areas and sections of the turbine engine 20.

The airfoil 62 includes a low-pressure surface 92 and a high-pressure surface 94 that extend between a leading edge 96 and a trailing edge 98. The low-pressure surface 92 and the high-pressure surface 94 are disposed between a first end 100 and a second end 102. The low-pressure surface 92 and the high-pressure surface 94 may comprise a continuous uninterrupted surface spanning between the first end 100, the second end 102, the leading edge 96 and the trailing edge 98. One or both low-pressure surface 92 and the high-pressure surface 94 may include the flow feature 88 located along a chord-wise or mean-camber-line arclength-wise location between the leading edge 96 and the trailing edge 98.

Referring also to FIG. 5 with continued reference to FIGS. 1, 2, 3 and 4, the airfoil 62 has a thickness 104 between the low-pressure surface 92 and the high-pressure surface 94 that is normal to a mean camber-line 106. The thickness 104 is symmetrical about the mean camber-line 106 from the leading edge 96 to the flow feature 88. In one example embodiment, a maximum thickness 108 is disposed at a location that is greater than 50% of a chord length 80 measured from the leading edge 96.

In one example embodiment, the flow feature 88 is located just aft or at the location of the maximum thickness 108. Accordingly, in one example embodiment, the flow feature 88 is located at greater than 50% of the chord length 80. In another example embodiment, the maximum thickness 108, and thereby the flow feature 88 may be located at a location greater than 66% of the chord length 80 from the leading edge 96. In yet another example embodiment, the maximum thickness 108, and thereby the flow feature 88 may be located aft or at a location greater than 75% of the chord length 80 from the leading edge 96. It should be appreciated that the maximum thickness 108 and flow feature 88 may be commonly located along the chord length 80 or at different locations.

Moreover, although a single flow feature 88 is shown by way of example, more than one flow feature 88 may be provided along the chord length 80 of the airfoil 62. Furthermore, although the example flow feature 88 is shown on the low-pressure surface 92, the flow feature 88 may be provided on the high-pressure surface 94. Additionally, the flow feature 88 may extend from the first end 100 to the second end 102 or may extend for a fraction less than the entire length between the first end 100 and the second end 102.

Referring to FIG. 3 with continued reference to FIG. 5, the airfoil 62 includes a surface 110 that is within a distance 112 aft of the flow feature 88 that extends to the trailing edge 98. A thickness in the distance 112 can taper to a minimum thickness 114 such that the surface 110 is substantially flat up to a minimum radius of the trailing edge 98. The distance 112 and trailing edge 98 are thereby shaped to provide a locally increasing boundary-layer edge velocity on the surface 110 that can promote an increase in pressure-surface loading while trimming the thickness 114 to an allowable minimum.

The fan inlet case strut 62 can be part of a plurality of struts 62 that can be arrayed about the circumference 116 of the fan inlet case 60. The throat margin can be a ratio of the minimum area between the struts 62 and the inlet flow area 118 of the fan inlet case area 60. By arranging the struts 62 with the flow features 88 the throat margin can be increased and thus provide increased flow capacity, lower flow losses.

A technical advantage of the disclosed fan inlet case strut includes incorporation of the increased flow capacity strut geometry.

Another technical advantage of the disclosed fan inlet case strut includes.

Another technical advantage of the disclosed fan inlet case strut includes shortening the strut cover length without creating structural issues with the fan inlet case.

Another technical advantage of the disclosed fan inlet case strut includes shortening the strut cover to gain cross sectional area within the fan inlet case area.

Another technical advantage of the disclosed fan inlet case strut includes addition of the cross-sectional area of the strut structural section enables thinning the strut or reducing the strut count in the fan inlet case.

There has been provided a fan inlet case strut. While the fan inlet case strut has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A fan inlet case strut comprising:
   a strut structural section;

a strut cover disposed over a portion of the strut structural section;
   a strut airfoil section formed with a high pressure surface and a low pressure surface connected at a leading edge and a trailing edge and extending from a first end to a second end;
   a camber line that extends between the leading edge and the trailing edge;
   a flow feature formed at a strut cover termination; and
   wherein the strut airfoil section comprises a surface that is within a distance aft of the flow feature that extends to the trailing edge; the surface also extends spanwise between the first end and the second end, wherein a thickness of the airfoil along the distance tapers to a minimum thickness such that the surface is flat up to a minimum radius of the trailing edge.

2. The fan inlet case strut according to claim 1, wherein the flow feature is formed at the strut cover termination at a predetermined cut back length.

3. The fan inlet case strut according to claim 1, wherein the strut airfoil section comprises a profile defined by a camber-angle distribution designed in conjunction with a thickness distribution configured to induce a localized forced non-equilibrium boundary-layer static pressure-rise process.

4. The fan inlet case strut according to claim 1, wherein the strut structural section comprises a nominal cross sectional thickness and the fan inlet case strut comprises an extended thickness located beyond the strut cover.

5. The fan inlet case strut according to claim 4, wherein the extended thickness is larger than the nominal cross sectional thickness.

6. The fan inlet case strut according to claim 1, wherein the flow feature is located at greater than 50% of a chord length of the fan inlet case strut.

7. A gas turbine engine having a fan inlet case comprising:
   a fan inlet case strut formed within the fan inlet case, the fan inlet case strut includes a span dimension extending between and connected with an inner surface and an outer surface of a bypass duct of the gas turbine engine; the fan inlet case strut comprising a strut structural section;
   a strut cover disposed over a portion of the strut structural section;
   a strut airfoil section formed with a high pressure surface and a low pressure surface connected at a leading edge and a trailing edge and extending from a first end to a second end;
   a camber line that extends between the leading edge and the trailing edge; and
   a flow feature formed at a strut cover termination; wherein flow feature is formed at the strut cover termination at a predetermined cut back length; wherein the strut structural section comprises a nominal cross sectional thickness and the fan inlet case strut comprises an extended thickness located beyond and external of the strut cover; wherein the extended thickness is larger than the nominal cross sectional thickness.

8. The gas turbine engine having a fan inlet case according to claim 7, wherein the strut airfoil section comprises a profile defined by a camber-angle distribution designed in conjunction with a thickness distribution configured to induce a localized forced non-equilibrium boundary-layer static pressure-rise process; wherein the forced non-equilibrium boundary-layer pressure-rise locally generates turbulence production relative to turbulence dissipation in the boundary-layer, enabling the boundary-layer to tolerate a higher local rate of static pressure-rise without separating.

9. The gas turbine engine having a fan inlet case according to claim 7, wherein the flow feature is coextensive with a maximum thickness, the flow feature being located at a location greater than 66% of a chord length of the strut airfoil from the leading edge.

10. The gas turbine engine having a fan inlet case according to claim 7, wherein the flow feature is located at a location greater than 75% of a chord length of the strut airfoil from the leading edge.

11. The gas turbine engine having a fan inlet case according to claim 7, wherein more than one flow feature is formed along a chord length of the strut airfoil.

12. A process for forming a fan inlet case strut comprising:

forming a strut structural section;

forming a strut cover disposed over a portion of the strut structural section;

forming a strut airfoil section with a high pressure surface and a low pressure surface connected at a leading edge and a trailing edge and extending from a first end to a second end, a camber line that extends between the leading edge and the trailing edge;

forming a flow feature at a strut cover termination, wherein the flow feature comprises a discontinuous surface between the strut cover and the strut structural section; and locating the flow feature at greater than 50% of a chord length of the fan inlet case strut.

13. The process of claim 12, further comprising:

forming the flow feature at the strut cover termination at a predetermined cut back length.

14. The process of claim 12, further comprising:

forming the strut airfoil section comprising a profile defined by a camber-angle distribution designed in conjunction with a thickness distribution configured to induce a localized forced non-equilibrium boundary-layer static pressure-rise process; wherein the forced non-equilibrium boundary-layer pressure-rise locally generates turbulence production relative to turbulence dissipation in the boundary-layer, enabling the boundary-layer to tolerate a higher local rate of static pressure-rise without separating.

15. The process of claim 12, further comprising:

forming the strut structural section comprising a nominal cross-sectional thickness; and forming the fan inlet case strut comprising an extended thickness located beyond the strut cover; wherein the extended thickness is larger than the nominal cross-sectional thickness.

16. The process of claim 12, further comprising:

forming the flow feature at a location greater than 75% of a chord length of the strut airfoil from the leading edge.

17. The process of claim 12, further comprising:

forming more than one flow feature along a chord length of the strut airfoil.

* * * * *